May 12, 1931.    U. A. TADDIKEN    1,804,569
AIR EJECTOR
Filed Jan. 26, 1929
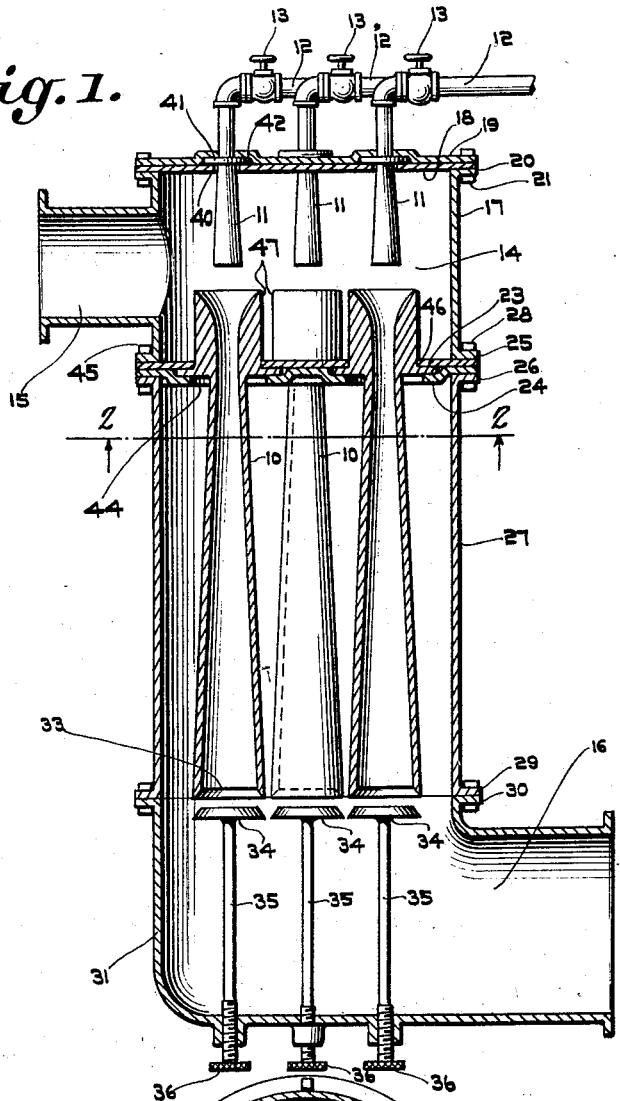
Fig. 1.
Fig. 2.
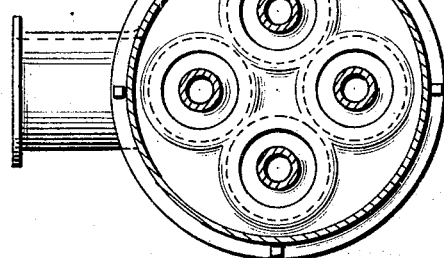
Inventor:
U. A. TADDIKEN.
Attorney Patented May 12, 1931

1,804,569

UNITED STATES PATENT OFFICE

ULRICH A. TADDIKEN, OF PHILADELPHIA, PENNSYLVANIA, ASSIGNOR TO WESTINGHOUSE ELECTRIC & MANUFACTURING COMPANY, A CORPORATION OF PENNSYLVANIA

AIR EJECTOR

Application filed January 26, 1929. Serial No. 335,318.

My invention relates to vacuum-producing apparatus of the ejector type.

Ejectors are commonly used in fields where it is desired to produce vacuous conditions, or sub-atmospheric pressure, by the withdrawal of air. It frequently occurs that variation in capacity is desirable; and, since the capacity of a single air ejector cannot be varied substantially with the preservation of the best efficiency, it is desirable to employ a multiplicity of ejectors and to depend upon cutting in and out ejectors to secure variation. Such an arrangement is particularly suitable for use with paper-making machines. For convenience, appearance, economy of construction, efficiency in manipulation, and protection, it is desirable that the battery of ejectors be constructed as a unit. Accordingly, it is an object of my present invention to provide ejector apparatus having a plurality of diffusers and steam nozzles associated with a common mixing chamber, the diffusers being arranged in a shell and discharging into the lower or outer portion of the latter. A more particular object of my invention is to provide apparatus of this character with convenient means for cutting in and out the ejectors.

These and other objects are effected by my invention as will be apparent from the following specification and claims taken in connection with the accompanying drawings, forming a part of this application, in which:

Fig. 1 is a vertical sectional view of my improved vacuum-producing apparatus; and, Fig. 2 is a sectional view taken along the line II—II of Fig. 1 and viewed in the direction of the arrows.

Referring now to the drawings more in detail, I show a plurality of ejector diffusers 10 with which are aligned the steam nozzles 11 supplied with steam from pipes 12 having control valves 13.

The inlet ends of the diffusers and the discharge ends of the steam nozzles 11 communicate with a common mixing chamber 14 having an inlet 15 communicating with any suitable region where it is desired to maintain a low pressure. The discharge ends of the diffusers 10 communicate with the outlet passage 16.

The mixing chamber 14 is defined by any suitable wall construction or shell, for example, the cylindrical wall or tubular element 17 closed at its upper end by the inner and outer plate members 18 and 19, the outer edges of such plate members being connected to a flange 20 on the member 17 by any suitable means, for example, by bolts 21. The plates 18 and 19 not only serve to close the upper ends of the chamber 14 but they also support the steam nozzles 11.

The lower end of the mixing chamber 14 is closed by cooperating plates 23 and 24, the outer edges of the latter being arranged between a flange 25 formed at the lower end of the cylindrical body 17 and a flange 26 formed at the upper end of the cylindrical shell 27, the flanges 25 and 26 and the plates 23 and 24 being secured together by any suitable means, for example, by the bolts 28. The cooperating plates 23 and 24 serve to support the diffusers 10. The lower end of the cylindrical shell 27 is preferably provided with a flange 29 to which is secured a flange 30 provided on the outlet or elbow member 31 having said discharge passage 16.

The discharge ends of the diffusers 10 are preferably provided with valve seats 33 with which cooperate valves 34 carried by stems 35 threaded through the wall of the elbow member 31 and having exterior operating hand wheels 36. It will, therefore, be apparent that one or more of the ejectors may be rendered ineffective or cut out, steam being shut off by closing the corresponding valve 13; and, at the same time, the corresponding diffuser has its discharge end closed by its valve 34. It is necessary that, when a steam nozzle is cut-out, the discharge end of the corresponding diffuser shall be closed in order to avoid any disturbance of pressure conditions as between the mixing chamber 14 and the discharge end of the passage 16.

As shown in the drawing, I provide means which is simple in structure for holding both the steam nozzles 11 and the diffusers 10 in proper aligned positions. The steam nozzles 11 are arranged to pass through openings 40 provided in the plate 18, such nozzles having flanges 41 thereon to rest on the upper surface of the plate 18. The upper plate 19 is suitably up-set or recessed, as indicated at 42, to engage over the flanges 41. Hence, when the plates 18 and 19 are secured in place with respect to the flange 20, the nozzles 11 will be held in place.

Likewise, the diffusers 10 are held in position properly aligned with the steam nozzles 11 by somewhat similar means. The lower plate 24 is provided with openings 44 large enough to permit of the insertion of the diffusers 10 downwardly therethrough until the outwardly-extending flanges 45 of the diffusers rest on the plate 24. The upper plate 23 is provided with openings 46 arranged to engage the upper surfaces of flanges 45 and fit rather closely the cylindrical upper portions 47 of the diffusers 10. One or both of the plates 23 and 24, for example, the lower plate 24, is up-set or recessed in order to provide suitable spaces for the reception of the flanges 45.

In operation, the inlet 15 of the mixing chamber 14 is connected to any suitable region where it is desired to maintain a sub-atmospheric pressure and one or more of the ejectors are rendered effective to maintain the desired reduced pressure. If, to maintain the desired reduced pressure condition, variation in capacity should become necessary, then this variation may be taken care of by cutting in or out of the ejectors. An ejector may be rendered effective simply by opening its steam valve 33 and its diffuser valve 34, and an ejector may be rendered ineffective by closing these valves, it being necessary to close the valve at the discharge end of the diffuser to avoid an open passage that might otherwise exist between the mixing chamber 14 and the discharge passage 16.

From the foregoing, it will be apparent that I have provided a unitary vacuum-producing apparatus incorporating a plurality of ejectors each of which is provided with a diffuser and a steam nozzle. The diffusers and the steam nozzles communicate with a common mixing chamber and the diffusers are arranged within a common shell so that the discharge ends thereof may communicate with a common discharge passage or chamber, the shell providing the discharge passage or chamber and supporting the valves for controlling the discharge ends of the diffusers. It will also be apparent that, with apparatus of this character, I have provided reliable and easily manufactured structure for supporting the steam nozzles and the diffusers. In other words, all of the parts are arranged and constructed to provide a unitary apparatus whose capacity may be varied by cutting in and out of the ejectors thereof. Accurate assembly of the apparatus is facilitated by the alined openings provided in the plates forming a top for the entrainment chamber and those arranged between the latter and the shell providing an enclosure for the major portions of the diffusers and a discharge chamber for the latter. More particularly the lower plate of the upper pair and the upper plate of the lower pair serve to aline and maintain alined the steam nozzles and the diffusers.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In vacuum-producing apparatus, the combination of an upper shell member, a lower shell member, a pair of plates secured between the upper and the lower shell members and having aligned openings therein, the lower plate having openings of sufficient size to permit of the passage of the major portion of the diffusers therethrough, said diffusers having flanges to rest upon the upper surface of the lower plate and the upper plate having the openings thereof engaging about the upper portions of the diffusers so that the lower surface of such upper plate engages the upper surfaces of the diffuser flanges, a pair of plates closing the upper end of the upper shell and the lowermost plate thereof having openings through which the motive fluid nozzles depend so that flanges provided on such nozzles may rest on the upper surface of the lowermost plate and the uppermost plate having openings therein to engage with the upper ends of the steam nozzles so as to engage the upper surfaces of said nozzle flanges, the motive fluid nozzles being aligned with the diffusers, valves for controlling the supply of motive fluid to the nozzles, and valves carried by the lowermost shell member for controlling the discharge ends of the diffusers.

2. In vacuum-producing apparatus, the combination of an entrainment chamber having an inlet connection and provided with first and second plates having aligned openings; motive fluid nozzles arranged in the openings of the first plate; diffusers aligned with the nozzles and arranged in the openings of the second plate; a casing having an outlet connection, connected to the entrainment chamber, and enclosing the portions of the diffusers projecting beyond the second plate; valve means for controlling the admission of motive fluid to each nozzle; and valves carried by said casing, operable externally thereof, and arranged to close the diffusers.

In testimony whereof, I have hereunto subscribed my name this 23rd day of January, 1929.

ULRICH A. TADDIKEN.